(12) United States Patent
Bae et al.

(10) Patent No.: US 11,683,762 B2
(45) Date of Patent: Jun. 20, 2023

(54) METHOD FOR CONTROLLING TRANSMISSION POWER IN WIRELESS COMMUNICATION SYSTEM, AND APPARATUS THEREFOR

(71) Applicant: LG ELECTRONICS INC., Seoul (KR)

(72) Inventors: Duckhyun Bae, Seoul (KR); Yunjung Yi, Seoul (KR); Inkwon Seo, Seoul (KR); Hyunho Lee, Seoul (KR); Daesung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/690,618

(22) Filed: Mar. 9, 2022

(65) Prior Publication Data
US 2022/0201618 A1 Jun. 23, 2022

Related U.S. Application Data

(63) Continuation of application No. 16/634,805, filed as application No. PCT/KR2018/008798 on Aug. 2, 2018, now Pat. No. 11,304,146.
(Continued)

(51) Int. Cl.
*H04B 7/00* (2006.01)
*H04W 72/04* (2023.01)
*H04W 52/04* (2009.01)
*H04W 52/10* (2009.01)
*H04W 52/14* (2009.01)
(Continued)

(52) U.S. Cl.
CPC .......... *H04W 52/14* (2013.01); *H04W 52/18* (2013.01)

(58) Field of Classification Search
None
See application file for complete search history.

(56) References Cited

U.S. PATENT DOCUMENTS 8,954,064 B2 * 2/2015 Baldemair ............ H04L 5/0016
455/434
8,958,841 B2 * 2/2015 Chung .................. H04W 52/10
455/522
(Continued)

FOREIGN PATENT DOCUMENTS

KR 10-2004-0093749 A 11/2004
KR 10-2006-0031863 A 4/2006
(Continued)

*Primary Examiner* — Tuan A Tran
(74) *Attorney, Agent, or Firm* — Dentons US LLP

(57) ABSTRACT

A method for controlling transmission power in a wireless communication system, and an apparatus therefor are disclosed in the disclosure. Specifically, the method for controlling uplink transmission power in a wireless communication system, that is performed by a terminal, may comprise the steps of: receiving from a base station power control configuration information with respect to a plurality of power control domains by means of higher layer signalling; receiving from the base station downlink control information (DCI) including transmission power control (TPC) information with respect to at least one of the plurality of power control domains; and performing uplink transmission using transmission power that is determined based on the power control configuration information and the TPC information.

10 Claims, 8 Drawing Sheets

Related U.S. Application Data

(60) Provisional application No. 62/617,089, filed on Jan. 12, 2018, provisional application No. 62/541,054, filed on Aug. 3, 2017.

(51) Int. Cl.
*H04L 5/00* (2006.01)
*H04L 27/26* (2006.01)
*H04W 52/18* (2009.01)

(56) References Cited

U.S. PATENT DOCUMENTS

| | | | | |
|---|---|---|---|---|
| 9,237,566 B2* | 1/2016 | Park | | H04L 5/0055 |
| 9,288,766 B2* | 3/2016 | Larsson | | H04W 52/367 |
| 9,319,211 B2* | 4/2016 | Larsson | | H04L 1/1812 |
| 9,345,044 B2* | 5/2016 | Tang | | H04W 76/00 |
| 9,420,545 B2* | 8/2016 | Cai | | H04W 52/143 |
| 9,497,741 B2* | 11/2016 | Park | | H04W 72/23 |
| 9,544,102 B2* | 1/2017 | Nguyen | | H04W 72/23 |
| 9,860,046 B2* | 1/2018 | Park | | H04W 72/23 |
| 9,876,620 B2* | 1/2018 | Nam | | H04L 5/001 |
| 9,907,058 B2* | 2/2018 | Park | | H04W 52/146 |
| 9,949,284 B2* | 4/2018 | Wu | | H04W 72/12 |
| 10,284,329 B2* | 5/2019 | Tan | | H04L 5/001 |
| 10,389,491 B2* | 8/2019 | Huss | | H04L 1/1861 |
| 10,405,307 B2 | 9/2019 | Nguyen | | H04L 5/0051 |
| 10,455,514 B2* | 10/2019 | Oh | | H04W 52/42 |
| 10,506,521 B2 | 12/2019 | Oh | | H04L 1/1861 |
| 10,616,925 B2* | 4/2020 | Blankenship | | H04W 74/0833 |
| 10,707,994 B2* | 7/2020 | Lindqvist | | H04L 1/0041 |
| 10,862,628 B2* | 12/2020 | Huss | | H04L 5/001 |
| 10,897,751 B2* | 1/2021 | Baldemair | | H04L 5/0053 |
| 2013/0100842 A1 | 4/2013 | Nishikawa | | H04W 52/16 370/252 |
| 2014/0080538 A1 | 3/2014 | Damnjanovic | | H04W 52/34 455/522 |
| 2018/0139751 A1 | 5/2018 | Park | | H04W 52/228 |
| 2018/0176945 A1 | 6/2018 | Cao | | H04L 1/1822 |
| 2019/0335400 A1 | 10/2019 | Gong | | H04W 52/146 |

FOREIGN PATENT DOCUMENTS

| | | | |
|---|---|---|---|
| KR | 10-2010-0032912 A | 3/2010 | |
| WO | 03/069808 A1 | 8/2003 | |
| WO | 2014/137129 A2 | 9/2014 | |
| WO | WO-2018018472 A1 | 2/2018 | ........... H04L 1/1896 |

* cited by examiner

[FIG. 1]
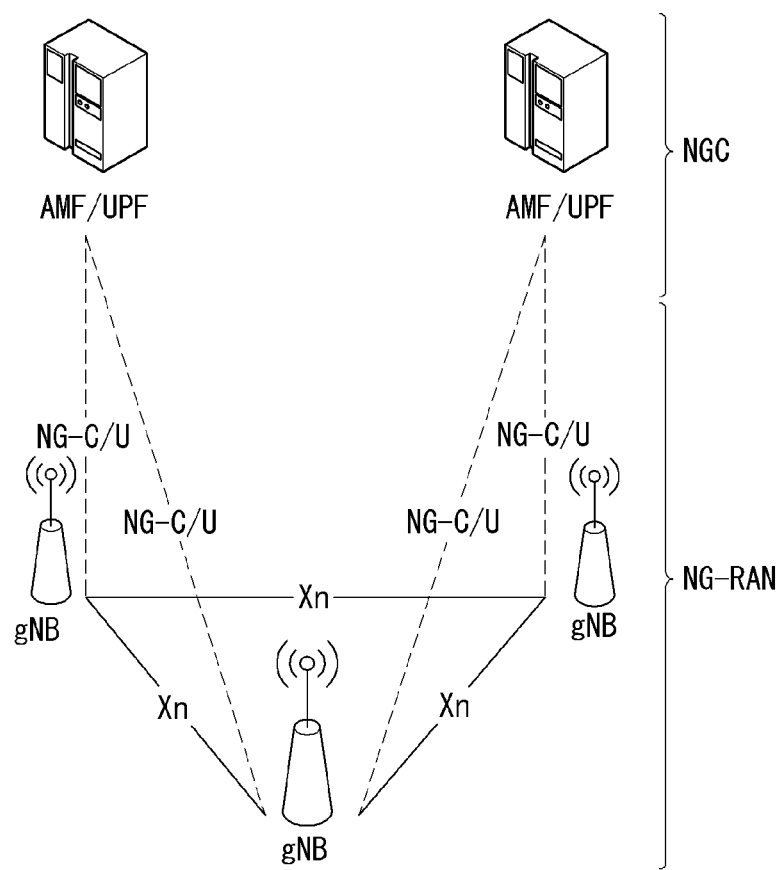

[FIG. 2]
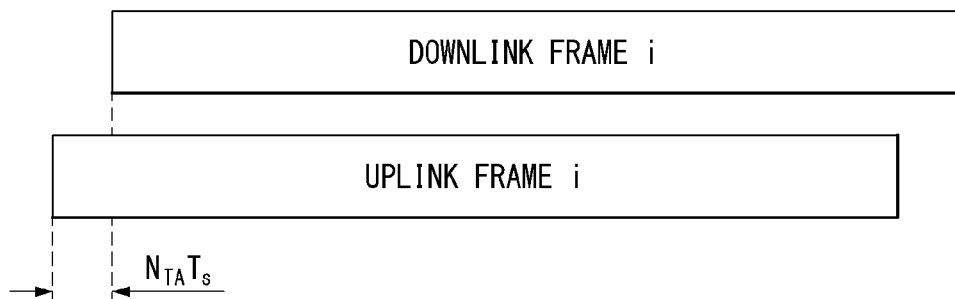

[FIG. 3]
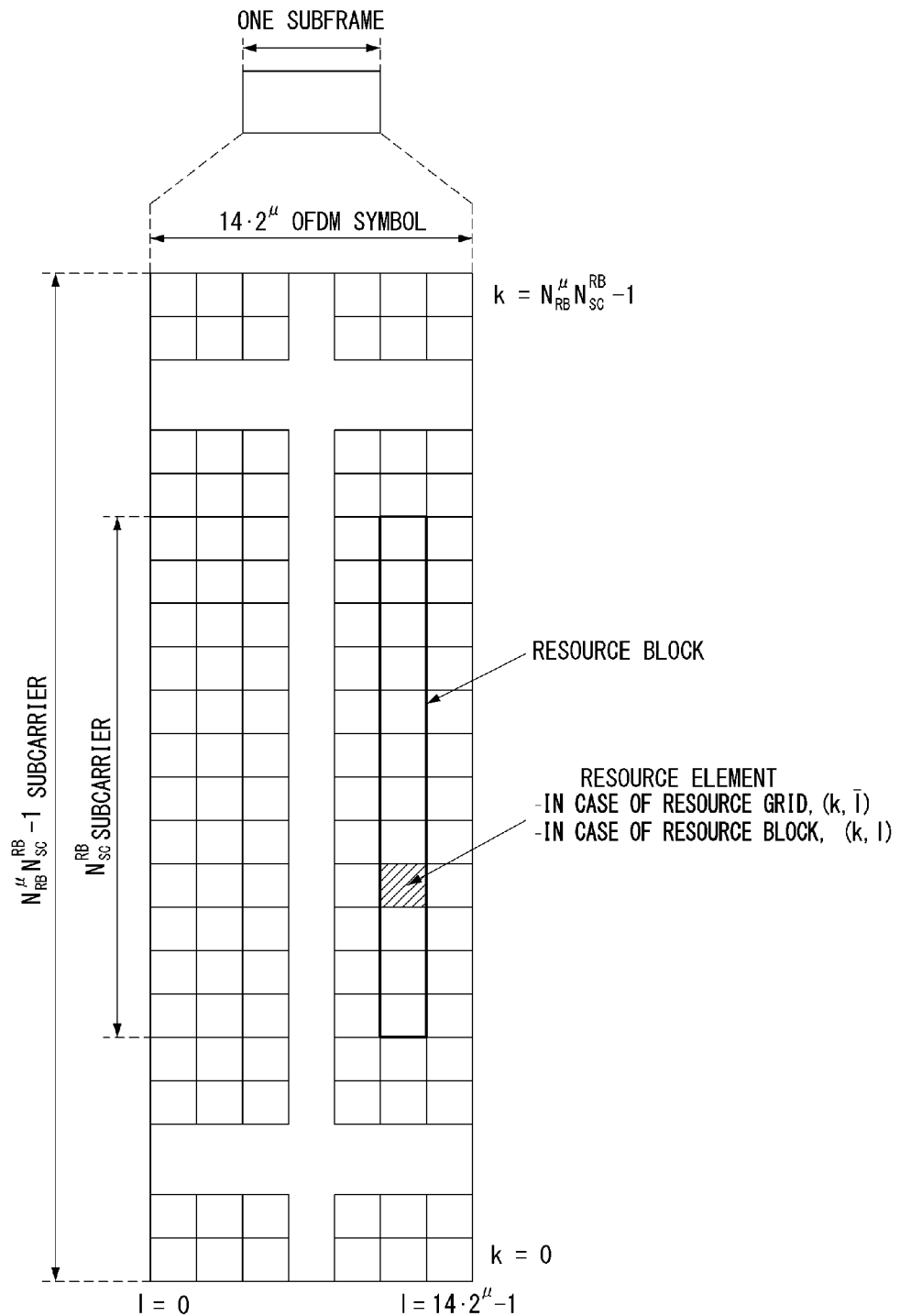

[FIG. 4]
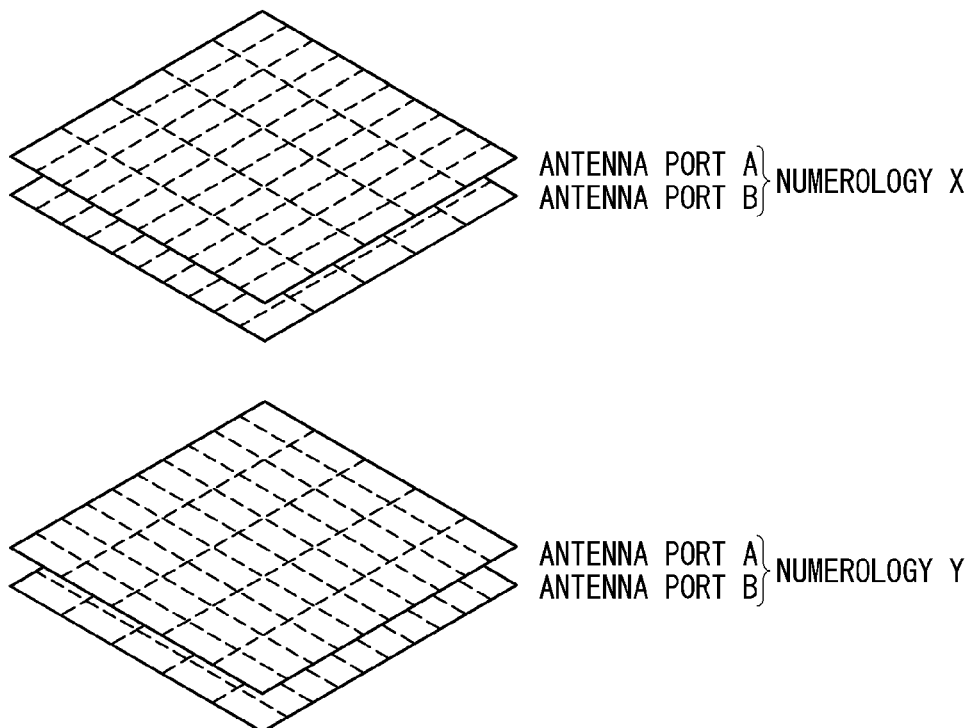

[FIG. 5]
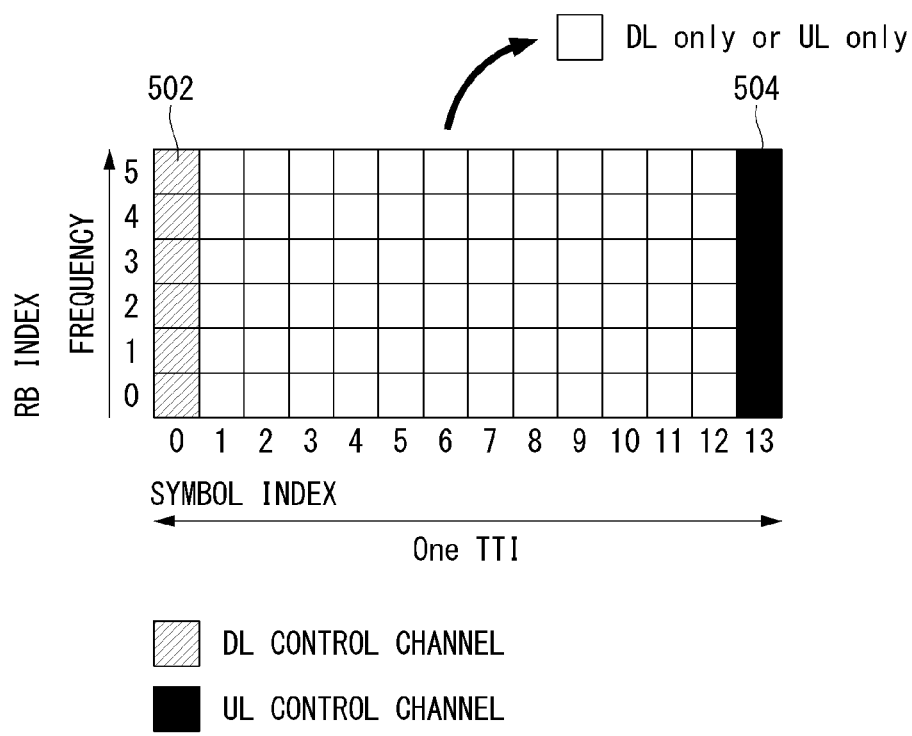

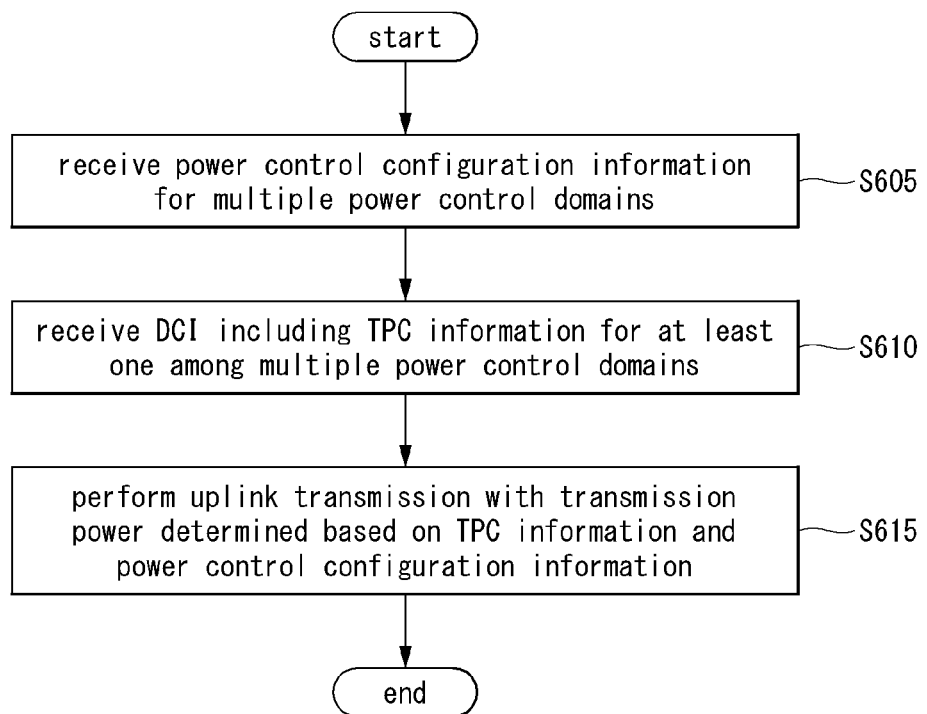

[FIG. 7]
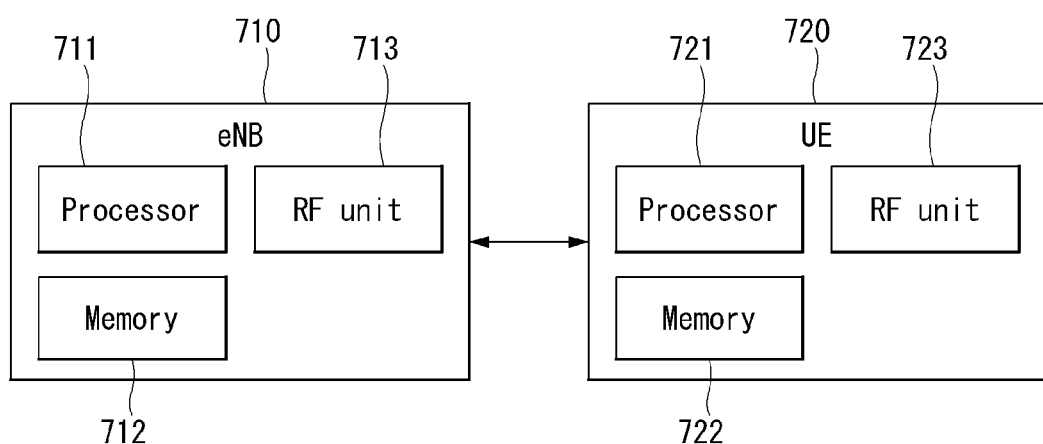

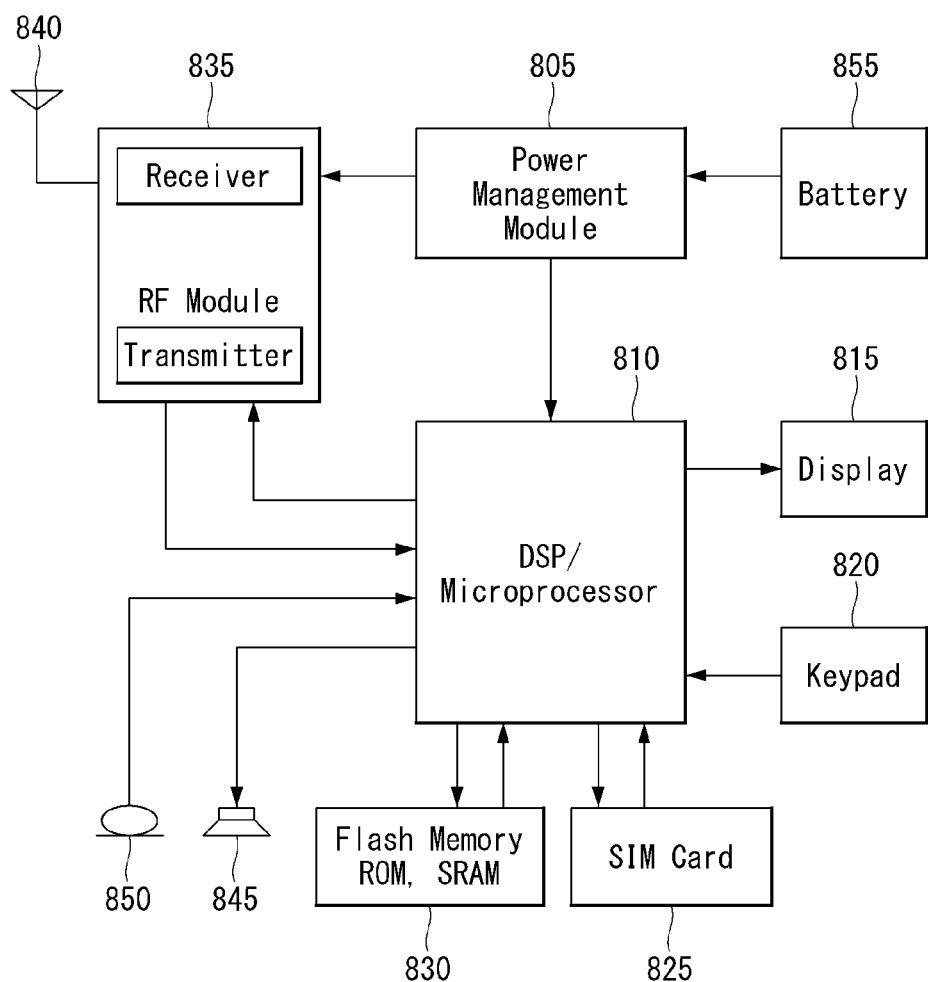
[FIG. 8]

METHOD FOR CONTROLLING TRANSMISSION POWER IN WIRELESS COMMUNICATION SYSTEM, AND APPARATUS THEREFOR

This application is a continuation application of U.S. patent application Ser. No. 16/634,805, filed on Jan. 28, 2020, which is the National Stage filing under 35 U.S.C. 371 of International Application No. PCT/KR2018/008798, filed on Aug. 2, 2018, which claims the benefit of U.S. Provisional Application Nos. 62/541,054, filed on Aug. 3, 2017, and 62/617,089, filed on Jan. 12, 2018, the contents of which are all hereby incorporated by reference herein in their entirety.

TECHNICAL FIELD

The disclosure relates to a wireless communication system, and more specifically, to a method for performing uplink transmission power control and apparatus for supporting the same.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DETAILED DESCRIPTION OF THE DISCLOSURE

Technical Problem

The disclosure proposes a method of controlling uplink transmission power in a wireless communication system.

In particular, the disclosure proposes a method of controlling uplink transmission power depending on various power control domains differentiated considering, e.g., uplink transmission-related settings and/or various uplink transmission types.

Specifically, proposed is a method of setting, e.g., signaling of power control-related parameters and transmission power control (TPC) commands for various power control domains.

Objects of the disclosure are not limited to the foregoing, and other unmentioned objects would be apparent to one of ordinary skill in the art from the following description.

Technical Solution

According to an embodiment of the disclosure, a method of controlling uplink transmission power in a wireless communication system is performed by a user equipment (UE) and comprises receiving, from a base station, power control configuration information for multiple power control domains via higher layer signaling, receiving, from the base station, downlink control information (DCI) including transmission power control (TPC) information for at least one of the multiple power control domains, and performing uplink transmission with transmission power determined based on the power control configuration information and the TPC information, wherein transmission power for specific power control domains among the multiple power control domains may be determined based on common TPC information, and transmission power for at least one power control domain except for the specific power control domains may be determined based on TPC information independently configured for each power control domain.

Further, in the method according to an embodiment of the disclosure, the specific power control domains may be selected based on a location on a resource region of an uplink resource for each power control domain among the multiple power control domains.

Further, in the method according to an embodiment of the disclosure, respective uplink resources for the specific power control domains may be identical to each other or are positioned adjacent to each other.

Further, in the method according to an embodiment of the disclosure, the uplink resource may correspond to at least one of a resource block, a bandwidth part, or a carrier.

Further, in the method according to an embodiment of the disclosure, the multiple power control domains may include a first power control domain for uplink transmission which is based on an uplink grant and a second power control domain for uplink transmission which is not based on an uplink grant.

Further, in the method according to an embodiment of the disclosure, TPC information for the second power control domain may be transmitted in combination with hybrid automatic repeat and request-ACK (HARQ-ACK) feedback transmitted by the base station.

Further, in the method according to an embodiment of the disclosure, a time of reception of the TPC information may be set to differ per power control domain.

Further, in the method according to an embodiment of the disclosure, the power control configuration information may include information indicating a time of reception of TPC information for each of the multiple power control domains.

Further, in the method according to an embodiment of the disclosure, the power control configuration information may include offset information between power control domains.

Further, in the method according to an embodiment of the disclosure, one of the multiple power control domains may be set as a reference power control domain, and power control configuration information for the other power control domains than the reference power control domain may be set with an offset for a power control value set for the reference power control domain.

According to an embodiment of the disclosure, a UE controlling uplink transmission power in a wireless communication system may comprise a radio frequency (RF) unit for transmitting/receiving a radio signal and a processor functionally connected with the RF unit. The processor may receive, from a base station, power control configuration information for multiple power control domains via higher layer signaling, receive, from the base station, downlink control information (DCI) including transmission power control (TPC) information for at least one of the multiple power control domains, and perform uplink transmission with transmission power determined based on the power control configuration information and the TPC information, wherein transmission power for specific power control domains among the multiple power control domains may be determined based on common TPC information, and transmission power for at least one power control domain except for the specific power control domains may be determined based on TPC information independently configured for each power control domain.

Further, in the UE according to an embodiment of the disclosure, the specific power control domains may be selected based on a location on a resource region of an uplink resource for each power control domain among the multiple power control domains.

Further, in the UE according to an embodiment of the disclosure, respective uplink resources for the specific power control domains may be identical to each other or are positioned adjacent to each other.

Further, in the UE according to an embodiment of the disclosure, the uplink resource may correspond to at least one of a resource block, a bandwidth part, or a carrier.

Further, in the UE according to an embodiment of the disclosure, a time of reception of the TPC information may be set to differ per power control domain.

Advantageous Effects

According to the embodiments of the disclosure, a UE performing uplink transmission may apply adequate power control information or power control parameters depending on the context.

Further, according to the embodiments of the disclosure, signaling overhead or control overhead may be reduced in transferring power control information or power control parameters.

According to the embodiments of the disclosure, it is also possible to efficiently transfer different power headroom reports (PHRs) for various uplink transmission methods to the base station.

The effects of the disclosure are not limited to the above-described effects and the other effects will be understood by those skilled in the art from the following description.

BRIEF DESCRIPTION OF DRAWINGS

The accompanying drawings, which are included herein as a part of a description in order to help understanding of the disclosure, provide embodiments of the disclosure, and describe the technical features of the disclosure with the description below.

FIG. 1 illustrates an example of an overall structure of a new radio (NR) system to which a method proposed by the disclosure may be implemented.

FIG. 2 illustrates a relationship between an uplink (UL) frame and a downlink (DL) frame in a wireless communication system to which a method proposed by the disclosure may be implemented.

FIG. 3 illustrates an example of a resource grid supported in a wireless communication system to which a method proposed by the disclosure may be implemented.

FIG. 4 illustrates examples of resource grids for each antenna port and numerology to which a method proposed in this specification may be applied.

FIG. 5 is a diagram illustrating one example of a self-contained slot structure to which the method proposed in the present specification may be applied.

FIG. 6 is a flowchart illustrating operations of a UE controlling uplink transmission power in a wireless communication system to which a method as proposed in the disclosure is applicable.

FIG. 7 illustrates a block diagram of a wireless communication device to which methods proposed in this specification may be applied.

FIG. 8 illustrates a block diagram of a communication device according to an embodiment of the disclosure.

MODE FOR CARRYING OUT THE DISCLOSURE

Some embodiments of the disclosure are described in detail with reference to the accompanying drawings. A detailed description to be disclosed along with the accompanying drawings is intended to describe some exemplary embodiments of the disclosure and is not intended to describe a sole embodiment of the disclosure. The following detailed description includes more details in order to provide full understanding of the disclosure. However, those skilled in the art will understand that the disclosure may be implemented without such more details.

In some cases, in order to avoid making the concept of the disclosure vague, known structures and devices are omitted or may be shown in a block diagram form based on the core functions of each structure and device.

In this specification, a base station has a meaning as a terminal node of a network that directly communicates with a terminal. In this document, a specific operation described as being performed by the base station may be performed by an upper node of the base station in some cases. That is, it is apparent that various operations performed for communication with the terminal in the network constituted by multiple network nodes including the base station may be performed by the base station or network nodes other than the base station. A 'base station (BS)' may be replaced with terms including a fixed station, a Node B, an evolved-NodeB (eNB), a base transceiver system (BTS), an access point (AP), a next generation NB, general NB, gNodeB (gNB), and the like. Further, a 'terminal' may be fixed or mobile and may be replaced with terms including a mobile station (UE), a mobile station (MS), a user terminal (UT), a mobile subscriber station (MSS), a subscriber station (SS) Advanced Mobile Station (WT), a Wireless Terminal (WT), a Machine-Type Communication (MTC) device, a Machine-to-Machine (M2M) device, and a Device-to-Device (D2D) device, and the like.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the disclosure, and the use of such specific terms may be changed in various forms without departing from the technical sprit of the disclosure.

The following technologies may be used in a variety of wireless communication systems, such as code division multiple access (CDMA), frequency division multiple access (FDMA), time division multiple access (TDMA), orthogonal frequency division multiple access (OFDMA), single carrier frequency division multiple access (SC-FDMA), and non-orthogonal multiple access (NOMA). CDMA may be implemented using a radio technology, such as universal terrestrial radio access (UTRA) or CDMA2000.

TDMA may be implemented using a radio technology, such as global system for mobile communications (GSM)/general packet radio service (GPRS)/enhanced data rates for GSM evolution (EDGE). OFDMA may be implemented using a radio technology, such as Institute of electrical and electronics engineers (IEEE) 802.11 (Wi-Fi), IEEE 802.16 (WiMAX), IEEE 802.20, or evolved UTRA (E-UTRA). UTRA is part of a universal mobile telecommunications system (UMTS). 3rd generation partnership project (3GPP) Long term evolution (LTE) is part of an evolved UMTS (E-UMTS) using evolved UMTS terrestrial radio access (E-UTRA), and it adopts OFDMA in downlink and adopts SC-FDMA in uplink. LTE-advanced (LTE-A) is the evolution of 3GPP LTE.

Embodiments of the disclosure may be supported by the standard documents disclosed in at least one of IEEE 802, 3GPP, and 3GPP2, that is, radio access systems. That is, steps or portions that belong to the embodiments of the disclosure and that are not described in order to clearly expose the technical spirit of the disclosure may be supported by the documents. Furthermore, all terms disclosed in this document may be described by the standard documents.

In order to more clarify a description, 3GPP LTE/LTE-A/New RAT(NR) is chiefly described, but the technical characteristics of the disclosure are not limited thereto.

As propagation of smart phones and Internet of things (IoT) terminals rapidly spreads, the amount of information which is transmitted and received through a communication network increases. Accordingly, in the next generation wireless access technology, an environment (e.g., enhanced mobile broadband communication) that provides a faster service to more users than existing communication systems (or existing radio access technology) needs to be considered.

To this end, a design of a communication system that considers machine type communication (MTC) providing a service by connecting multiple devices and objects is discussed. Further, a design of a communication system (e.g., Ultra-Reliable and Low Latency Communication (URLLC)) considering a service and/or a user equipment sensitive to reliability and/or latency of communication is also discussed.

Hereinafter, in this specification, for easy description, the next-generation wireless access technology is referred to as a new radio access technology (RAT) (NR) radio access technology and the wireless communication system to which the NR is applied is referred to as an NR system.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface.

Overview of System

FIG. 1 is a diagram illustrating an example of an overall structure of a new radio (NR) system to which a method proposed by the disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or $\mu$). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| $\mu$ | $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/1000) \cdot T_s=1$ ms. In this case, there may be a set of UL frames and a set of DL frames.

FIG. 2 illustrates a relationship between a UL frame and a DL frame in a wireless communication system to which a method proposed by the disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology $\mu$, slots are numbered in ascending order of $n_s^\mu \in \{0, \ldots, N_{subframe}^{slots,\mu}-1\}$ in a subframe, and in ascending order of $n_{s,f}^\mu \in \{0, \ldots, N_{frame}^{slots,\mu}-1\}$ in a radio frame. One slot is composed of continuous OFDM symbols of $N_{symb}^\mu$, and $N_{symb}^\mu$ is determined depending on a numerology in use and slot configuration. The start of slots $n_s^\mu$ in a subframe is temporally aligned with the start of OFDM symbols $n_s^\mu N_{symb}^\mu$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

Referring to FIG. 3, a resource grid is composed of $N_{RB}^\mu N_{sc}^{RB}$ subcarriers in a frequency domain, each subframe composed of 14·2μ OFDM symbols, but the disclosure is not limited thereto.

In the NR system, a transmitted signal is described by one or more resource grids, composed of $N_{RB}^\mu N_{sc}^{RB}$ subcarriers, and $2^\mu N_{symb}^{(\mu)}$ OFDM symbols. Herein, $N_{RB}^\mu \le N_{RB}^{max,\mu}$. The above $N_{RB}^{max,\mu}$ indicates the maximum transmission bandwidth, and it may change not just between numerologies, but between UL and DL.

In this case, as illustrated in FIG. 4, one resource grid may be configured for the numerology μ and an antenna port p.

TABLE 2

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^\mu$ | $N_{frame}^{slots,\mu}$ | $N_{subframe}^{slots,\mu}$ | $N_{symb}^\mu$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted may be inferred from another channel over which a symbol on the same antenna port is transmitted. When large-scale properties of a channel received over which a symbol on one antenna port may be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the disclosure may be implemented.

FIG. 4 shows an example of antenna ports and ringer-specific resource grids to which the method proposed herein may be applied.

Each element of the resource grid for the numerology μ and the antenna port p is indicated as a resource element, and may be uniquely identified by an index pair (k,l̄). Herein, $k=0, \ldots, N_{RB}^\mu N_{sc}^{RB}-1$ is an index in the frequency domain, and $\bar{l}=0, \ldots, 2^\mu N_{symb}^{(\mu)}-1$ indicates a location of a symbol in a subframe. To indicate a resource element in a slot, the index pair (k,l) is used. Herein, $l=0, \ldots, N_{symb}^\mu-1$.

The resource element (k,l̄) for the numerology μ and the antenna port p corresponds to a complex value $a_{k,\bar{l}}^{(p,\mu)}$. When there is no risk of confusion or when a specific antenna port or numerology is specified, the indexes p and μ may be dropped and thereby the complex value may become $a_{k,\bar{l}}^{(p)}$ or $a_{k,\bar{l}}$.

In addition, a physical resource block is defined as $N_{sc}^{RB}=12$ continuous subcarriers in the frequency domain. In the frequency domain, physical resource blocks may be numbered from 0 to $N_{RB}^\mu-1$. At this point, a relationship between the physical resource block number $n_{PRB}$ and the resource elements (k,l) may be given as in Equation 1.

$$n_{PRB} = \left\lfloor \frac{k}{N_{sc}^{RB}} \right\rfloor \quad \text{[Equation 1]}$$

In addition, regarding a carrier part, a UE may be configured to receive or transmit the carrier part using only a subset of a resource grid. At this point, a set of resource blocks which the UE is configured to receive or transmit are numbered from 0 to $N_{URB}^{\mu}-1$ in the frequency region.

Self-Contained Structure

A time division duplexing (TDD) structure considered in the NR system is a structure in which both uplink (UL) and downlink (DL) are processed in one slot (or subframe). This is to minimize the latency of data transmission in the TDD system and the structure may be referred to as a self-contained structure or a self-contained slot.

FIG. 5 illustrates one example of a self-contained structure to which the method proposed in this specification may be applied. FIG. 5 is just for convenience of the description and does not limit the scope of the disclosure.

Referring to FIG. 5, it is assumed that one transmission unit (e.g., slot or subframe) is constituted by 14 orthogonal frequency division multiplexing (OFDM) symbols as in legacy LTE.

In FIG. 5, a region 502 refers to a downlink control region and a region 504 refers to an uplink control region. Further, a region (that is, a region without a separate indication) other than the regions 502 and 504 may be used for transmitting downlink data or uplink data.

That is, uplink control information and downlink control information may be transmitted in one self-contained slot. On the contrary, in the case of data, the uplink data or downlink data may be transmitted in one self-contained slot.

When the structure illustrated in FIG. 5 is used, in one self-contained slot, downlink transmission and uplink transmission may sequentially proceed and transmission of the downlink data and reception of uplink ACK/NACK may be performed.

Consequently, when an error of data transmission occurs, a time required for retransmitting data may be reduced. Therefore, latency associated with data delivery may be minimized.

In the self-contained slot structure illustrated in FIG. 5, a time gap for a process of switching from a transmission mode to a reception mode in a base station (eNodeB, eNB, or gNB) and/or a terminal (user equipment (UE)) or a process of switching from the reception mode to the transmission mode is required. In association with the time gap, when the uplink transmission is performed after the downlink transmission in the self-contained slot, some OFDM symbol(s) may be configured as a guard period (GP).

Analog Beamforming

In a millimeter wave (mmWave, mmW) communication system, as the wavelength of the signal becomes shorter, multiple (or multiplex) antennas may be installed in the same area. For example, in a 30 CHz band, the wavelength is approximately 1 cm, and when antennas are installed at an interval of 0.5 lambda in a panel of 5 cm×5 cm according to a two-dimensional arrangement form, a total of 100 antenna elements may be installed.

Accordingly, in the mmW communication system, a method for increasing coverage or increasing the throughput by increasing a beamforming (BF) gain using multiple antenna elements or increasing a throughput may be considered.

In this case, when a transceiver unit (TXRU) is installed so as to adjust transmission power or a phase for each antenna element, independent beamforming is possible for each frequency resource.

However, a method for installing the TXRU in all antenna elements (e.g., 100 antenna elements) may be ineffective in terms of cost. As a result, a method for mapping multiple antenna elements to one TXRU and controlling a direction of a beam by using an analog phase shifter may be considered.

The aforementioned analog beamforming method may generate only one beam direction in all bands, so that a frequency selective beam operation may not be performed.

As a result, hybrid beamforming with B TXRUs that are fewer than Q antenna elements, in the form of an intermediate form of digital beamforming and analog beamforming, may be considered. In this case, although there is a difference depending on a connection method of B TXRUs and Q antenna elements, the number of directions of the beams that may be transmitted at the same time is limited to B or less.

Uplink Transmission Power Control in NR System

NR systems may consider methods of performing uplink transmission without receiving a grant (e.g., an uplink (UL) grant) when a UE performs uplink transmission depending on service sectors (i.e., application sectors) or traffic types. In this case, the UE may perform uplink transmission via semi-persistently configured resources.

Such transmission scheme may be referred to as a grant-free transmission scheme. At this time, the grant-free transmission scheme may also be denoted as a configured-grant transmission scheme in light that configuration information, e.g., resource allocations, is transmitted via higher layer signaling.

That is, the grant-free transmission scheme mentioned in the disclosure may mean a scheme in which a UE performs uplink transmission without receiving a grant (e.g., a UL grant) (namely 'grant-free') from a base station. In other words, the grant-free transmission scheme may mean a scheme in which a UE performs uplink transmission based on semi-static scheduling, rather than dynamic scheduling by a base station. In this case, the UE may be previously allocated resources for uplink transmission, and the UE may perform uplink transmission under the assumption that there is a grant for the allocated resources.

In contrast, a scheme in which a UE performs uplink transmission based on a grant received from a base station may be referred to as a grant-based transmission scheme. The grant-based transmission scheme may also be named uplink transmission (e.g., PUSCH transmission) scheduled by DCI in light that it is uplink transmission by dynamic scheduling.

In the grant-free transmission scheme, radio resources different UEs share on a contention basis or dedicated radio resources allocated to the UE may be used.

NR systems may consider a method of applying a different modulation and/or coding scheme than that for radio resources allocated by an uplink grant (i.e., grant-based transmission scheme) to radio resources used in the grant-free transmission scheme. NR systems may also consider a method of applying different transmit block sizes (TBSs) and/or different transmission time intervals (TTIs) between the grant-free transmission scheme and the grant-based transmission scheme.

The UE may be allocated one or more radio resources for the grant-free transmission scheme. Multiple radio resources used in the grant-free transmission scheme may be configured to have the same or different (or overlapping) sizes, modulation and coding schemes, or time/frequency scheduling units. Also considerable is a method of setting the UE to repeatedly attempt transmission of the same data (or traffic) so as to enhance the success rate of grant-free transmission.

As described above, NR systems may consider the grant-free transmission scheme in which a UE performs uplink transmission without scheduling (in particular, dynamic scheduling) by a base station. Unlike the grant-based transmission scheme, the grant-free transmission scheme may share radio resources with other UE on a contention basis and, thus, use of equivalent transmission power (TX power) between the UEs may be critical. Further, since various target requirements and various scheduling units are available in NR systems, different power control may be required depending on each parameter.

That is, NR systems may support various uplink transmissions for which different power control parameters may be used. In other words, in relation to NR system uplink transmission power control, it is needed to consider various power control domains (i.e., various power control types) for various uplink transmissions. References for differentiating between the power control domains are described below in detail in their relevant parts.

Next-generation communication systems (e.g., NR systems) consider uplink transmission by a UE without scheduling from a base station (i.e., grant-free transmission scheme). The grant-free transmission scheme may consider a method of using, on a contention basis, a resource pool that multiple UEs share for efficient use of resources. In the contention-based resource use, it may be efficient that the transmit power of each UE meets a level equivalent to that of the base station so as to efficiently support the UEs.

Further, since NR systems use various target requirements (e.g., requirements for supporting various services) and/or various scheduling units as compared with legacy systems (e.g., LTE systems), it is needed to use a flexible power control scheme depending on the context.

Described herein are methods of applying different pieces of power control-related information and/or parameters for various uplink transmissions and minimizing signaling overhead considering what have been described above. Also described herein is a method of transmitting a UE's power headroom report (PHR) to a base station when various pieces of power control-related information and/or parameters are used.

In the disclosure, 'power control domain' may mean a domain or unit differentiated to apply a different power control scheme depending on a specific reference. For example, power control domains may be differentiated depending on transmission types or scheduling units. This is described below in detail in its relevant part.

In the disclosure, radio resources or resources may be differentiated from each other depending on multiple access schemes, e.g., spreading code, scrambling code, interleaving pattern, or power allocation, as well as on time/frequency resources.

The methods (or specific embodiments) described below are differentiated merely for illustration purposes, and some configurations or features of a method may be included in another method or may be replaced with the corresponding configurations or features of the other method.

Various Power Control Methods for Uplink Transmission in NR Systems

Legacy systems (e.g., LTE systems) have adopted a scheme of performing uplink power control on each of different carriers that the UE uses. In other words, in the legacy systems, power control may be individually performed for each of different radio channel environments.

In contrast, in NR systems, unlike the legacy systems, a UE may use various scheduling units, bandwidth parts, or uplink schemes (i.e., uplink transmission types). Thus, for NR systems, it may be efficient to perform different types of power control depending on the uplink transmission that the UE performs as well as power control for different radio channel environments.

The following methods 1-1) to 1-3) may be considered to use different transmission power (TX power) depending on the UE's uplink transmission methods or parameters used for uplink transmission.

Method 1-1)

A first method that may be consider is that the base station performs power control using one transmit power control (TPC) (TPC is a TPC command) and power control for different uplink transmissions is performed via semi-static higher layer signaling and/or dynamic physical layer signaling (L1 signaling). In the disclosure, TPC may mean a TPC command, TPC information, or TPC parameter (included in downlink control information).

In other words, a shared (i.e., common) TPC may be used for (all or some of) various uplink transmissions, and a parameter used for other power control (hereinafter, power control parameter) may be individually used according to each uplink transmission.

For example, although the grant-free transmission scheme and the grant-based transmission scheme use different types of power control, a TPC for the grant-based transmission scheme may also be applicable to the grant-free transmission scheme. However, different power control parameters (e.g., pathloss compensation parameters or power offset) may be configured separately for different power control domains (via higher layer signaling and/or physical layer signaling). In particular, where a configuration for the grant-free transmission scheme is made by higher layer signaling or by a combination of higher layer signaling and physical layer signaling, the power control parameter may be transferred along with a configuration for the grant-free transmission scheme.

That is, where multiple power control schemes (i.e., multiple power control domains) for various uplink transmissions apply, a common TPC applies for all or some, and they may be configured to be differentiated therebetween by an offset value set in relation to power control.

Method 1-2)

A method that may be considered is that the base station transfers a TPC applied only to a specific power control domain as necessary while power control is performed as in method 1-1).

For example, as compared with the above-described method 1-1), 'one shot' TPC information indicated dynamically may be transferred additionally. Such TPC information may apply during a specific length of slot or subfeature or only for the next transmission.

Method 1-3)

Another method that may be taken into account is that the base station transfers different TPCs for different types of power control. In other words, power control may be configured to be performed using different TPCs for different power control domains or different power control schemes.

For example, where the base station separately performs power control on the grant-free transmission scheme and the grant-based transmission scheme, a TPC for grant-free (i.e., a first TPC) and a TPC for grant-based (i.e., a second TPC) may be transmitted separately or together to one UE.

That is, where multiple power control schemes (i.e., multiple power control domains) for various uplink transmissions apply, TPC information and offset values set in relation to power control, which are configured independently from each other may apply.

The above-described methods 1-1) to 1-3) may apply independently or in combination for multiple power control domains. For example, method 1-1) or 1-2) may apply to some of the multiple power control domains and method 1-3) may apply to the others.

A specific power control domain may be set as a reference point (i.e., a reference power control domain or power reference point) to share a TPC and set a different offset per power control domain in using the above-described methods 1-1) or 1-2). The reference point may be set to differ per power control domain.

The domain that is to be used as the reference point may be previously determined by the PUSCH that the UE has used upon RRC connection or may be determined by the base station's semi-static higher layer signaling or dynamic physical layer signaling. In particular, where a configuration for the grant-free transmission scheme is made by higher layer signaling or by a combination of higher layer signaling and physical layer signaling, information for the reference point may also be included in the configuration of signaling. Further, when setting the reference point, the offset of each power control domain along with the reference point may also be determined by the base station's semi-static higher layer signaling or dynamic physical layer signaling.

Where the reference point is set as such, it may be assumed in using the above-described method 1-2) that the UE uses the transmitted reference point in power control for the reference point without separately indicating a power control domain. In this case, the TPC applied only for a specific power control domain (e.g., the above-described 'one shot' TPC information) may apply only for a predetermined time length or the next transmission or may be one to vary the offset for the reference point for the power control domain.

At this time, power control domains may be differentiated (or divided) by the following methods 2-1) to 2-7) in using various power control schemes via the above-described methods. The methods described below are differentiated solely for ease of description, and the methods may be combined together or some configurations thereof may be replaced.

Method 2-1)

The power control domains may be separated by the uplink transmission schemes (or uplink transmission types) that the UE uses.

For example, power control of the grant-free transmission scheme and power control of the grant-based transmission scheme may be performed separately. In other words, a power control domain for the grant-free transmission scheme (i.e., a first power control domain) and a power control domain for the grant-based transmission scheme (i.e., a second power control domain) may be separately configured.

The grant-free transmission scheme may be typically used for traffic with higher requirements (e.g., ultra-reliable low-latency communication (URLLC) traffic). At this time, since UEs are able to share the same time/frequency resource, different power control than the grant-based transmission scheme may be required given the power headroom of other UEs.

Therefore, power control for the grant-free transmission scheme may be varied depending on whether the time/frequency resource is shared and the UE group sharing resources. In this case, the following schemes may be further taken into consideration so as to differentiate between the power control domains.

First, where one UE is able to use multiple grant-free resources (i.e., resources for the grant-free transmission scheme), different types of power control may be performed depending on whether the grant-free resources are contention-based or not (i.e., contention-free).

Or, where multiple UEs share one grant-free resource, and one UE is able to use multiple grant-free resources (in particular, when the UE group sharing each grant-free resource may differ per grant-free), different power control may be performed per UE group or grant-free group. Where a UE is able to use multiple grant-free resources, the base station may not simply control the transmit power for which the UE uses the resource via power control signaling, e.g., TPC, but may also indicate which one of the grant-free resources the UE is able to use is appropriate.

For example, where the UE's transmission fails due to interference, the base station may indicate the index of the grant-free resource that a smaller number of UEs share or the index of the grant-free resource that other UEs are not currently transmitting via, e.g., TPC. Or, in such a case, the base station may transfer an indication that the UE is to use a resource other than the resource it is currently using to the UE via TPC. This may advantageously increase the transmit power while minimizing interference that may influence other UEs.

Or, where multiple grant-free resources are allocated to one UE, different power control may be performed depending on types of grant-free transmission schemes. At this time, grant-free transmission scheme types may be differentiated by configuration methods. For example, a first type of grant-free transmission scheme may mean that grant-free resources are configured only by higher layer signaling (e.g., RRC signaling), and a second type may mean that grant-free resources are configured by higher layer signaling and physical layer signaling (e.g., RRC signaling and L1 signaling).

Or, where multiple grant-free resources are allocated for one UE, in particular when multiple grant-free resources are present in different cells, different power control may be performed on each cell. Such power control is also available for the grant-based resources of the cells.

Method 2-2)

Power control domains may be divided depending on the scheduling units (e.g., slots or mini-slots) the UE (and/or base station) uses. In other words, different power control may be performed depending on the scheduling unit applied to the UE's uplink transmission.

Where the accuracy of channel estimation is variable depending on the length of the scheduling unit or where it is closely related to the target requirements, e.g., the latency of the scheduling unit the UE uses, the differentiating scheme may be useful.

Method 2-3)

Different power control may be performed depending on the control resource set (CORESET) where the UE receives TPC. Where different control resource sets are used depending on the bandwidth parts and/or carriers the UE uses, the differentiating scheme may be useful.

If the control resource set is associated with a specific time/frequency resource which is the same as the bandwidth part, the differentiating scheme may be interpreted as power control on uplink transmission in the time/frequency domain. Or, the differentiating scheme may be to perform power control on the uplink (UL) grant or PUCCH assignment transferred in the control domain.

Method 2-4)

The target requirement (e.g., block error rate (BLER) or latency requirement) of the transport block (TB) the UE is to transmit may be set to differ per TB. In this case, different power control may apply per target requirement and, to that end, the base station may be configured to transmit different TPCs depending on target requirements. In other words, different power control domains may be configured depending on the conditions required for TB transmission. For a different target requirement, different transmit power may be needed. Thus, such differentiating scheme may be useful when the UE transmits TBs with different target requirements.

Where a target requirement is determined by the TB's specific category or transmission mode, it may be to transmit the TPC for the category or transmission mode. That is, in such a case, power control may be performed by transmitting the TPC for the specific category or transmission mode.

Or, where the TPC is explicitly mapped to the target requirement, it may be one applied to the TB with the same target requirement regardless of other differentiation. That is, in this case, the same power control may be performed on the TB with the same target requirement regardless of other differentiation.

Method 2-5)

Different power control may be performed per hybrid automatic repeat request (HARQ) process of the UE. In other words, power control domains may be differentiated depending on HARQ processes. As set forth above, where the UE uses various uplink transmissions, if the base station is aware of information for the TB the UE is to transmit and the HARQ process number, the differentiating scheme may be useful. Further, where repetitive transmission is performed on the same TB, the differentiating scheme may be used to vary the target reliability depending on the repetition order.

In this case, if transmission of a new TB is able to be recognized via, e.g., other information (e.g., information indicating whether the new data indicator (NDI) bit toggles), the power control value for the TB or TPC may be rolled back first or partially. For example, where a new TB is transmitted, the TPC for the prior TB may be disregarded or only the TPC of the first or last N times may be applied for power control.

Or, where some HARQ process is mapped in a dedicated manner to a specific uplink transmission (e.g., where HARQ process #k is used for the grant-free transmission scheme), the differentiating scheme may be useful. In this case, although a new TB is transmitted, the value for power control might not be varied.

Method 2-6)

Different power control may be performed per bandwidth part the UE uses. In other words, power control domains may be differentiated depending on bandwidth parts. For a different bandwidth part, the UE may use a different frequency band. Therefore, the channel variation the UE experiences and interference with other UEs may vary as well. Where the bandwidth parts the UE uses overlap or are not positioned adjacent to each other, the differentiating scheme may be useful.

Where different power control is performed per bandwidth part, it may be similar to the legacy method of differentiating power control per carrier. Or, this may mean that different power control is used depending on the bandwidth part or frequency band the UE simply uses for uplink transmission.

Where multiple bandwidth parts configured in one UE may simultaneously be activated, power control may be performed in each bandwidth part group unit depending on the association between the bandwidth parts. Or, power control information for multiple bandwidth parts may be transferred via one message without a separate group. This may advantageously reduce control overhead and blind decoding trial.

Method 2-7)

Different power control may be performed per cell the UE uses. In other words, different power control domains may be configured depending on the cells the UE uses.

Specifically, the UE may apply, differently per cell, the TPC received from the base station or may receive multiple TPCs and apply them for uplink transmission of each cell.

One or more of the above-described methods 2-1) to 2-7) may be used in combination to differentiate power control domains. For example, methods 2-1) and 2-2) may be used together so that power control domains for the UE are differentiated into slot-based grant-free uplink transmission, mini-slot-based grant-free uplink transmission, slot-based grant-based uplink transmission, and mini-slot-based grant-based uplink transmission.

At this time, methods of configuring the TPC the base station transmits and a power offset to which the TPC applies may be taken into account. Hereinafter, methods 3-1) and 3-2) may be examples of such methods.

Method 3-1)

Where among the above-described methods 2-1) to 2-7), a method that may be considered is that two methods A and B are differentiated by $\{a_1, a_2, \ldots, a_n\}$ and $\{b_1, b_2, \ldots, b_n\}$, respectively, the base station transmits n TPC_A's and m TPC_B's, and the UE is configured to have two power offset values $\delta_A$ and $\delta_B$. In other words, the base station may transmit TPC values for all the scenario cases which are to be applied to power control domains to the UE.

Where the UE performs uplink transmission based on the method, the UE may apply TPC_A to $\delta_A$ and TPC_B to $\delta_B$.

Method 3-2)

Where among the above-described methods 2-1) to 2-7), a method that may be considered is that two methods A and B are differentiated by $\{a_1, a_2, \ldots, a_n\}$ and $\{b_1, b_2, \ldots, b_n\}$, respectively, the base station transmits up to n*M TPC_AB's, and the UE is configured to have one power offset value $\delta_{AB}$. In other words, the base station may combine the pieces of TPC information to be applied to power control domains and transmit them to the UE.

Where the UE performs uplink transmission based on the method, the UE may apply TPC_AB to $\delta_{AB}$.

Where the association between the two methods (i.e., A and B) is small or the number of types of power control (i.e., power control domains) differentiated by the method is large, the above-described method 3-1) may be useful. In the case of method 3-2), although the two methods A and B, respectively, have n power control domains and m power control domains, if the two methods are simultaneously applied, the number of power control domains differentiated may not be n*m. An example in which the above-described methods 2-1) and 2-2) are used is assumed. At this time, where use of a specific scheduling unit is limited in a specific uplink transmission scheme (e.g., when such a limitation is imposed where only mini-slots are used in the grant-based transmission scheme), the number of the cases of combinations of the two methods may be smaller than n*m. Thus, in some circumstances, method 3-2) may have smaller signaling overhead than method 3-1) does.

Further, methods A and B which are combined by method 3-2) may be defined as a new method A_B. Further, method 3-1) may be expanded like the scheme in which three TPCs and three power offset values are used if three or more methods are combined. In contrast, where three or more methods are combined in method 3-2), a scheme that may apply is that methods A and B may be first combined into a new method A_B, and methods A_B and C may be combined into method A_B_C.

Besides, where multiple methods are put to use, methods 3-1) and 3-2) may be used in combination. For example, where four methods A, B, C, and D are used, methods A and B may be used together and methods C and D may be used together according to method 3_2, and the combined methods A_B and C_D may be used together according to method 3-1).

Method of Configuring TPC Message for Multiple Types of Power Control

As set forth above, in NR systems, multiple types of power control, i.e., various power control domains, may be differentiated. At this time, to perform closed-loop power control on various power control domains, the base station needs to transfer TPCs for the power control domains.

At this time, since there may be multiple power control domains for the same physical channel unlike in the legacy schemes, it needs to be indicated which power control domain the TPC the base station transfers is for. In other words, a need exists for setting an indication scheme or indicator to indicate which one of multiple power control domains the TPC is to be mapped to.

In relation thereto, the following methods 4-1) to 4-7) may be considered. The methods described below are differentiated solely for ease of description, and the methods may be combined together or some configurations thereof may be replaced.

Method 4-1)

Considerable is a method of indicating a power control domain by adding an indication field (i.e., indication information or indicator bit field) to the TPC field (i.e., TPC bit field) when the TPC is transferred via DCI. At this time, the mapping relationship between the value indicated by the indication field and the index of the power control domain may be determined along when the power control domains are configured or may be determined in such a manner that power control domains configured in the UE are arranged in order as per a pre-defined rule.

Method 4-2)

Where the TPC is transferred via DCI, and the UE has multiple power control domains, a method that may be considered is to use a TPC bitmap that indicates TPCs for power control domains at once with multiple TPC fields concatenated. At this time, the order of TPCs constituting the TPC bitmap may be determined when the power control domains are configured or may be determined in such a manner that power control domains configured in the UE are arranged in order as per a pre-defined rule.

Transferring the TPC UE-specifically may advantageously control multiple power control domains allocated to the UE at the same time with a small control overhead.

Method 4-3)

Where the TPC is transferred by a group-specific DCI similar to DCI format 3/3A of the legacy system, a method that may be considered is that multiple TPC indexes are allocated to one UE, and power control domains are differentiated from each other. At this time, such differentiation may be performed using different TPC-group identifiers as needed to receive the group-specific DCI or may be performed only with the indexes and using the same identifier.

Further, where several UEs share one resource, e.g., grant-free resource, a method that may be considered is that multiple UEs share the TPC index in one TPC group and the base station transmits a group-common TPC for the resource. For example, where multiple grant-free resources are shared by multiple UEs, one resource may be set as a reference point, and UE-specific power control may be performed on the resource while a group-common offset may be set for the other resources. In particular, where the grant-free resources have the same or adjacent positions and use different parameters in the form of a resource pool, the scheme may apply.

Method 4-4)

Where the TPC is transferred via DCI, a method that may also be considered is to differentiate between power control domains depending on the uses or DCI formats of DCI.

For example, where the DCI is used for grant-free retransmission, although there is no explicit indicator, the TPC value transferred in the DCI may be configured to control only transmit power used for grant-free transmission. As another example, when the UE simultaneously monitors UE-specific DCI and group-based DCI, the power control domains for the DCIs may be set to differ from each other. As still another example, if the use of DCI is unclear as in the case where the DCI carrying the TPC simply includes the TPC alone, the UE may assume that a TPC transmitted within a predetermined time of feedback (e.g., HARQ-ACK feedback or UL grant) for some uplink transmission is a TPC for the transmission.

Method 4-5)

Also considerable is a method of differentiating power control domains via a control resource set (i.e., CORESET) carrying the TPC or a certain part of the control resource set. As an example, the certain part of the CORESET may mean a search space defined by some function or the resource element group (REG) or control channel element (CCE) in the CORESET.

Where the TPC is differentiated per bandwidth part, which power control domain the TPC indicates may be recognized (or identified) via what bandwidth part of the control resource set carrying the TPC is mapped to.

Or, to differentiate the TPC for a specific time/frequency resource, e.g., the grant-free resource, the base station may previously configure, for the UE, a control resource set where the TPC for the resource is to be transmitted or a certain part of the control resource set via higher layer signaling.

Method 4-6)

Where the TPC is transmitted via DCI (in particular, when the TPC is transferred via scheduling DCI), a method that may be considered is to implicitly indicate the power control domain via information contained in the DCI without explicit indication information. Indicating the power control domain using information used for other purposes without separate indication may be useful in terms of control overhead and DCI design. This is why as no separate information for indicating the power control domain is included in the DCI, the existing DCI payload size may be maintained, and the resultant effects (e.g., preventing the number of times of blind decoding by the UE from increasing) may be obtained.

For example, as mentioned above, where power control domains are differentiated by the HARQ process, scheduling unit, or bandwidth part, the power control domain to which the TPC is to be applied may be determined via other information that may be included in the scheduling DCI through which the TPC has been transferred without any separate indication. Here, the other information may correspond to, e.g., HARQ process ID, scheduling unit, resource allocation information, or bandwidth indicator.

Method 4-7)

Also considerable is a method of differentiating power control domains depending on the time of reception of the TPC by the UE (i.e., the time of reception of the DCI carrying the TPC).

For example, although the UE receives the same TPC entry #n(TPC entry #n) using the same TPC-RNTI, the UE may apply the TPCs the times of reception of which are $t_1$, $t_2$, and $t_3$ to other power control domains. In this case, the mapping relationship between the TPC reception time and the power control domain may be transferred when the power control domain is configured or by separate signaling. Further, information for the period and/or offset of monitoring the TPCs for other power control domains may previously be set via, e.g., higher layer signaling.

Method of Applying TPC and/or Offset Depending on the Relationship Between Power Control Domains As set forth above, NR systems may differentiate power control domains for the same physical channel as well as for different physical channels. In relation thereto, a power control scheme that may efficiently apply to the same or similar physical channel is described below in detail.

Where multiple power control schemes are used for various uplink transmissions of one UE, a method that may be considered is to set one power control domain as a reference point and perform power control on the other power control domains via an offset for the reference point so as to reduce signaling overhead. In other words, a configuration method that may be considered is that the TPC information is jointly applied to power control domains with a specific relationship (i.e., they are jointly controlled via DCI by the base station), but power control between the power control domains is performed based on offset information. Such method may be effective when two or more power control domains have different sizes but their variations are similar.

At this time, in a scheme of differentiating power control domains with a specific relationship, the physical position (i.e., the position on the resource region) of the uplink resource used by the power control domain may be considered. Here, the uplink resource used by the power control domain may mean an uplink resource allocated to the power control domain or an uplink resource to which power control according to the power control domain is applied.

For reference, the variation in power control may depend upon the physical position of the radio resource used by the UE. Accordingly, whether power control is rendered possible by offset may be determined via the physical position of the uplink resource used by two or more power control domains. Given the above descriptions of the disclosure, determining whether power control is possible via offset may mean determining whether TPC information is jointly available among the power control domains or needs to be independently used.

Specifically, where two or more separated different power control domains use the physical positions of uplink resources that are identical or adjacent to each other (i.e., the uplink resources are positioned within a range according to a specific rule), power control via offset may be determined to be possible. For example, where the resource blocks, bandwidth parts, and/or carriers of uplink resources that two power control domains use are the same or positioned adjacent to each other, power control via offset may be determined to be possible.

At this time, where a different scheduling unit or target requirement applies per power control (or power control domain), although the physical positions of uplink resources are the same or adjacent to each other, the variation in transmit power as necessary depending on the variation in the channel state may not be linear between the types of power control (or power control domains). Thus, such offset relationship may be semi-statically or dynamically indicated by higher layer signaling (e.g., RRC signaling) or physical layer signaling (e.g., L1 signaling).

Further, although the different power control domains are less associated with each other and, thus, are independently controlled by the base station, rather than via offset, a minimum relationship may be set by the UE's specific and/or used resource. In such a case, a method that may be considered is to set a lower boundary and/or upper boundary for other power control domains considering the power control domain that serves as the reference point.

For example, although the grant-based transmission scheme and the grant-free transmission scheme have different power control domains, the transmit power of the grant-based transmission scheme or a transmit power that is a predetermined level smaller than the transmit power of the grant-based transmission scheme may be set as the minimum value of transmit power of the grant-free transmission scheme. In contrast, the transmit power of the grant-free transmission scheme or a transmit power that is a predetermined level larger than the transmit power of the grant-free transmission scheme may be set as the maximum value of transmit power of the grant-based transmission scheme. As another example, where different power control domains are differentiated based on the target requirements, the transmit power for the requirement that is more difficult to meet may be set to be always larger.

Power Headroom Report (PHR) Method in Consideration of Multiple Power Control

The legacy PHR (e.g., the PHR of the LTE system) has been used to notify the base station of the UE's expected room for transmit power with respect to the scheduled uplink resource.

In contrast, in NR systems, uplink transmission may be rendered possible even when the UE is not separately scheduled via, e.g., the grant-free transmission scheme. Further, since such grant-free resources are assumed to be typically sporadic and have small traffic, it may be hard to transmit the PHR together with UE data. In particular, where the UE is allocated multiple grant-free resources or grant-free uplink transmission is rendered possible by various parameters via multiple grant-free configurations, it may be difficult to expect the transmit power that the UE is to use.

To address such issues, a method that may be considered is to perform PHR on various uplink transmissions via grant-based resources. As the UE previously transmits a PHR for the uplink resource that the UE is to use in other power control domain that is not currently scheduled even not with grant-free uplink transmission, the base station may perform power control more effectively.

Methods 5-1) to 5-4) described below represent example methods of transmitting a PHR for multiple types of power control (or multiple power control domains) in the scheduled uplink resource.

Method 5-1)

Considerable is a method of concatenating PHRs for multiple types of power control and representing the same in the form of a bitmap. That is, PHRs for multiple power control domains may be indicated using a PHR bitmap. In this case, the bit size required for each PHR may be simplified to reduce control overhead. Or, a one-bit indicator that simply indicates whether transmission is possible may be used.

At this time, where TPCs for power control domains may be transferred in such a manner as to be differentiated via group-specific DCI indexes, the PHR bitmap may be configured in order of the indexes. For example, TPC_A, TPC_B, and TPC_C for power control domains A, B, and C, respectively, are transferred with $k_a$, $k_b$, and $k_c$ ($k_a<k_b<k_c$), the PHRs may be transferred in the form of [PHR_A PHR_B PHR_C].

Or, where the TPCs for power control domains are transferred in the form of bit fields of the TPC bitmap, the PHR bitmap may be configured in a configuration order similar to that of the TPC bitmap. For example, TPC_A, TPC_B, and TPC_C for power control domains A, B, and C are transferred via DCI in the form of [TPC_A TPC_B TPC_C], the PHRs may be transferred in the form of [PHR_A PHR_B PHR_C].

Method 5-2)

Another method that may be considered is to add an indication field (i.e., an indicator bit field) for the power control domain to the PHR bit.

At this time, the mapping relationship between the value indicated by the indication field and the index of the power control domain may be determined along when the power control domains are configured or may be determined in such a manner that power control domains configured in the UE are arranged in order as per a pre-defined rule. Or, where indication information for the power control domain is included when the TPC is transferred via DCI, the value of the indication information may be used, as it is, in the indication field for the power control domain in the PHR bits.

Method 5-3)

Where multiple types of power control are configured in the form of specific reference power control and offset values therefor, a method that may be considered is to transmit the PHR for power control that becomes the reference point. That is, where multiple power control domains are configured in the form of a (preset) reference power control domain and its offsets, the UE may be configured to transmit the PHR for the reference power control domain.

For example, where types of power control (or power control domains) A, B, and C have the offset relationship of [0, −2, 2] with respect to A, the UE may be configured to transmit only the PHR for power control A.

Method 5-4)

Where multiple types of power control are configured in the form of specific reference power control and offset values therefor, a method that may be considered is to transmit the PHR for power control that has the smallest or largest offset. That is, where multiple power control domains are configured in the form of a (preset) reference power control domain and its offsets, the UE may be configured to transmit the PHR for the power control domain with the smallest or largest offset.

For example, where types of power control (or power control domains) A, B, and C have the offset relationship of [0, −2, 2] with respect to A, the UE may be configured to transmit only the PHR for power control B or C. This may prevent distortion of the PHR of a specific power control domain by the PHR representation range.

As described above in the method of applying TPCs and/or offsets depending on the relationship between the power control domains, the variation in power control may depend upon the physical position of the radio resource that the UE uses. Further, since PHRs are also influenced by variations in the open-loop component (e.g., variations by pathloss) of the power control, the variation may not be assumed to arise always independently simply because no association is established via offsets among the different types of power control.

A method that may be taken into account in such a case is that when transmitting a PHR (in particular, where the PHR transmission is triggered by a variation in pathloss), the UE may transmit only variations in the PHR that has previously been transmitted, and the variation is applied to the PHR values of other types of power control that the base station is aware of. Specific examples therefor may be methods 6-1) and 6-2) below.

Method 6-1)

The UE may be configured to transfer a quantized PHR value, as the PHR value, to the base station as it does conventionally, and the base station may be configured to compare the last value of the power control with the transmitted PHR value and apply the difference to all the PHR values of the other types of power control.

For such operation, an indicator that indicates that the variation in the PHR is applied to the other types of power control as well may be added to the PHR. At this time, the indicator may be replaced with an indicator that indicates the cause of PHR reporting triggering.

Method 6-2)

Or, the PHR value that the UE transmits may be set to a value that indicates the difference from the PHR previously transmitted. Where the PHR message is configured not to transmit multiple PHR values at once but to transmit only the PHR for one power control domain, this may be a value the reference for which is the last PHR transmitted without any separate indicator indicating the power control domain.

For such operation, an indicator that indicates that the variation in the PHR is applied to the other types of power control as well may be added to the PHR. At this time, the indicator may be replaced with an indicator that indicates the cause of PHR reporting triggering.

Method of Controlling Uplink Power Via Group-Common DCI in Other Cell

Further, NR systems may consider supporting closed power control command via group-common DCI using TPC-PUSCH-RNTI. At this time, the TPC may apply to type 1/2 PUSCH via group-common DCI. Further, the group-common DCI may include multiple TPC entries constituted of indexes for the UE to find TPC command. In this case, since type 1/2 resources may be configured for multiple UEs that perform sporadic transmission, it is needed to consider a method of clearly determining the TPC entry for the UE. Further, in the secondary cell (Scell), the TPC command for type 1/2 PUSCH may be transmitted from the same or different cells via cross-carrier scheduling.

Under the assumption that there are multiple UEs constituting TPC-PUSCH-RNTI, it is needed to consider splitting time domain for different UE sets to monitor different timing occasions for TPC command. This may be supported by configuring a period and offset for TPC-PUSCH-RNTI monitoring per type 1, or type 2 resource, per UE. Further, an entry index may be configured per type 1, or type 2 resource.

In relation to the foregoing, in NR systems, the TPC for dynamic PUSCH power control may be transferred from the common search space (CSS) to the UE via TPC-PUSCH-RNTI.

Where the UE is configured to use several cells, uplink power control may be performed differently per cell. At this time, application or accumulation of TPCs received via group-common DCI to the power control of all the cells may cause unnecessary TPC transmission. In particular, where the CSS for receiving the group-common DCI is present only in the primary cell (Pcell), the power of Pcell may continuously vary to control the power of Scell. Further, even where a CSS may be present per cell, it may be inefficient to allocate the CSS only for TPV.

Thus, applying a different TPC per cell may be useful and, to that end, the following methods may be considered.

First, the UE may be configured to be allocated a TPC entry along with the cell index (or cell identifier or cell ID) linked thereto. In this case, for multiple cells, several TPC entries may be configured simultaneously in the UE.

Or, a configured index range of the TPC entries may be one for cross-carrier TPC, rather than self-carrier TPC. If the UE receives the TPC in the range, the UE may be configured to apply the TPC of the entry to the Scell. At this time, if multiple TPCs or multiple ranges are allocated, each TPC may be applied in order of index of the Scell.

Or, the group-common DCI carrying the TPC may be configured to include a cell indicator field (CIF). The cell to which the TPC is to be applied may be indicated via the CIF.

Or, each TPC entry of the group-common DCI carrying the TPC may be configured to include a CIF indicator.

Where the use of the above-described methods and the methods (i.e., methods 4-1) to 4-7)) described in the method of configuring TPC message allows TPC more applications, the group-common DCI needs to be transmitted to more UEs for various elements. In particular, where power control (i.e., various power control domains) is needed in various domains as mentioned above, more TPC entries may need to be transmitted at once.

In this case, for efficient TPC transmission, TPC may be applied to different power control domains although the UE receives the same entry depending on the time of reception of TPC. For example, although the UE receives the same TPC entry #n using the same TPC-RNTI, the UE may apply the TPCs the times of reception of which are $t_1$, $t_2$, and $t_3$ to different power control domains. In this case, the mapping relationship between the TPC reception time and the power control domain may be transferred when the power control domain is configured or by separate signaling. Further, information for the period and/or offset of monitoring the TPCs for other power control domains may previously be set via, e.g., higher layer signaling.

Method of Performing Group-Based Power Control Signaling

It is considered in NR systems that where the UE uses the grant-free transmission scheme for sporadic traffic, multiple UEs share one resource. At this time, for multiplexing performance, it may matter that the base station controls the transmit power of each UE.

Legacy systems (e.g., LTE systems) have adopted a method of using TPC group and TPC-RNTI to control the transmit power of multiple UEs with small control overhead. However, given sporadic traffic, it may be hard to configure an adequate TPC group with low control overhead. For example, when 32-bit TPC bits are allocated to four grant-free resources that eight UEs may use, a very small number of UEs among 32 UEs may actually perform uplink transmission.

Further, given that the UE performs uplink transmission immediately without a separate prior signal (e.g., scheduling signal in the grant-free transmission scheme), the base station may determine candidate UEs the transmit power of which is to be controlled only after the UEs' uplink transmission. Such TPC transmission needs to be smaller than HARQ-round trip time (RTT) so that the UE may apply the same in the next repeated transmission or retransmission.

Thus, a method that may be considered is that the base station transfers TPC(s) (or TPC bit) of the UEs for which transmit power needs to be dynamically controlled in a single message (i.e., TPC message) without separate signaling between the base station and the UE, and the UE which attempts transmission receives its own bit among them.

Specifically, the base station may indicate, in the physical layer signaling (e.g., L1 signaling), only M UEs, which require TPC transmission (e.g., UEs transmitting data in the grant-free resource), from a superset of N UEs (e.g., UEs configured for grant-free resources). A method that may be considered in such a case is that the UE monitors, or does not monitor, the physical layer signaling arbitrarily (or by itself) by some condition (e.g., whether data is transmitted).

At this time, to transmit TPC (i.e., TPC bit) in the physical layer signaling, the following methods 7-1) to 7-6) may be considered. In the following methods, N UEs may mean all of the UEs constituting the superset, and M UEs may mean UEs that are to actually transmit data among them.

Method 7-1)

Considerable is a method of transmitting TPC (i.e., TPC command) with the TPC combined with HARQ-ACK feedback. In other words, the TPC command may be assumed to be limited only to the UE required to receive HARQ-ACK (i.e., UE that has started transmission). This may mean that upon HARQ-ACK transmission, the base station transmits TPC command together with it to the UE that has the HARQ-ACK transmission.

To that end, the base station may be configured to assume a bit number for HARQ-ACK transmission and continuously transmit TPC command for each corresponding bit. Since the total number of bits may be limited, the number of TPCs transmitted may be smaller than the number of HARQ-ACK transmissions.

Method 7-2)

The TPC bit may be transmitted to all of the UEs included in the superset, with any value or a bit meaning 'hold' or 'no control' assigned to the other UEs than M UEs which actually need TPC transmission. For example, the bit may be transmitted to all the UEs, but null information (or 0) may be assigned to the UEs which do not actually perform transmission.

Method 7-3)

Or, the base station may be configured to transmit M indexes each of which may indicate a respective one of M UEs and M TPC bits individually associated with the UEs. In other words, the base station may only transmit the indication information (e.g., identifier) indicating the UE actually performing transmission and the TPC bit for the UE.

In this case, each TPC field may consist of a field indicating the UE index and a field indicating the TPC bit (i.e., TPC information), namely, two subfields.

Method 7-4)

Also considerable is a method of transferring the bitmap constituted of TPCs for M UEs and the indexes indicating the M UEs in the superset.

For example, where TPC bits, T1, T2, and T3, need to be transmitted to the UEs corresponding to UE indexes 1, 2, and 5 in the superset constituted of eight UEs, the base station may transmit, to the UE, the TPC bitmap constituted of [T1 T2 T3] and such information as, e.g., [01101000] indicating positions (i.e., UE indexes) in the superset. As such, to indicate the position (i.e., UE index) in the superset whose size is N, a bitmap whose size is N may be used as in the above example.

Or, to indicate the position in the superset with a size of N, a bitmap with a size of N/K which result from grouping every K indexes of the indexes may be put to use. For example, where TPC bits, T1, T2, and T3, need to be transmitted to the UEs corresponding to UE indexes 1, 2, and 5 in the superset constituted of eight UEs, the base station may group every two UEs of the UEs and transmit, to the UE, the TPC bitmap constituted of [X T1 T2 X X T3] and such information as, e.g., [1110] indicating positions (i.e., UE indexes) in the superset. At this time, X may be set as any value or a bit that means 'hold' or 'no control.'

Or, to indicate the position in the superset with a size of N, a specific value indicating the start and end may be used. A method that may be considered as an example is to indicate the start and end of the indexes where M UEs are positioned and to indicate the TPC bit in the region.

Method 7-5)

Or, it may be assumed that the TPC index is implicitly mapped with the configured resource. For example, it may be assumed for the TPC transmitted in the nth slot (slot n) that the configured resource is applied only to the UE present in the n+kth slot (slot n+k) (i.e., the UE which is to perform data transmission in the slot) and that each TPC index is determined by the resource or follows the value set per UE or per resource. Further, k may be set to differ per UE or per resource and, if different, k may be configured via higher layer signaling.

Thus, where a resource is present in a specific slot (e.g., the Ith slot), the UE may be configured to perform TPC monitoring in slots (e.g., the I-kth slot) that have as large a difference as a predetermined offset (e.g., k).

Method 7-6)

Where the periodicity of grant-free resource is short, the operations of the above-described method 7-5) may enable multiple UEs to simultaneously monitor TPC. Therefore, the periodicity of transmission of TPC may be set separately from the periodicity of resource.

That is, the periodicity and offset at which the UE monitors TPC may be configured per UE, and the index to which the UE looks upon each monitoring may be configured per carrier, per cell, or per resource. Such configuration information may be transferred to the UE via signaling (e.g., higher layer signaling or physical layer signaling) by the base station.

At this time, the UE may assume that timing k when the TPC is transmitted is the same as the processing time for PUSCH transmission in the grant.

Further, TPC may be transmitted even in the case of type 1 or type 2 configured in the Scell and this may be transmitted in a cross-carrier scheme or self-carrier scheme. At this time, where the UEs receive an HARQ-ACK via group-common DCI as well, the UEs may simultaneously receive the HARQ-ACK and the TPC bit via single signaling. At this time, the UE receiving the TPC bit and the UE receiving the HARQ-ACK may be identical.

Thus, the TPC bit and the HARQ-ACK may be indicated via a common UE index. Or, HARQ-ACK information may be used together in addition to the UE index. For example, the base station may be configured to transmit the TPC bit only to UEs for which HARQ-ACK is not ACK/DTX among the UEs indicated by the UE index.

In contrast, even where the HARQ-ACK and TPC bit are transferred via separate signaling, if the UE is able to grasp the number (M) of UEs which have currently attempted transmission and its index (m) therein from the HARQ-ACK information, the TPC may be transferred with only M TPC bits.

Further, in relation to the methods described in the disclosure, if the UE makes use of various uplink transmission schemes, such as simultaneously supporting the grant-free transmission scheme and the grant-based transmission scheme, is allocated multiple grant-free resources, or supports multiple waveforms, different transmit power values may be used depending on contexts. In this case, different TPC groups (or TPCs) may be configured depending on different uplink transmission schemes, resources, or waveforms.

Further, upon transferring TPC via group-common DCI, an offset or target received power value to be used for open loop power control may be transferred per resource instead of transferring an offset or absolute value compared with the prior value as the TPC value.

Or, such values may be transferred per UE. This is for adjusting information (or parameters) used for power control when the UE performs open loop power control to adjust the target power of each UE or to efficiently perform, e.g., inter-UE multiplexing.

Signaling for transferring these values may be transmitted via a higher layer message (e.g., RRC message or medium access control-control element (MAC-CE)) or in the form of group-common DCI. UE-specific higher layer signaling (e.g., RRC signaling) may be used but, to dynamically adjust power, a dynamic signaling scheme may also be used.

Further, the above-described method may be used to set parameters or offset to be used in each group, with the UEs divided into several groups, when several UEs share the resource pool. In this case, per-resource pool and/or per-group power information (i.e., power parameter) may need to be transmitted UE-group commonly.

Where multiple power control domains need to be divided in NR systems and/or other wireless communication systems by the methods described in the disclosure, efficient uplink transmission power control may be possible. FIG. 6 illustrates a method of controlling uplink transmission power by applying the above-described methods.

FIG. 6 is a flowchart illustrating operations of a UE controlling uplink transmission power in a wireless communication system to which a method as proposed in the disclosure is applicable. FIG. 6 is intended merely for illustration purposes but not for limiting the scope of the disclosure.

Referring to FIG. 6, it is assumed that the UE and/or base station controls uplink transmission power by applying the methods proposed in the disclosure. Further, it is assumed in this case that the UE may perform various uplink transmissions and multiple power control domains have been differentiated for various uplink transmissions.

First, the UE may receive power control configuration information for multiple power control domains via higher layer signaling (e.g., RRC signaling or MAC layer signaling) (S605). In this case, the power control configuration information may include, e.g., parameters, for power control as described above.

At this time, the power control configuration information may include offset information between the power control domains as set forth above. Specifically, one of the multiple power control domains may be set as a reference power control domain, and power control configuration information for the other power control domains than the reference power control domain may be set with offset values for the power control value set for the reference power control domain.

The UE may receive DCI including the transmit power control information (i.e., the above-described TPC information) for at least one of the multiple power control domains from the base station (S610).

Thereafter, the UE may perform uplink transmission (i.e., uplink channel transmission and/or uplink signal transmission) with the transmit power determined based on the received power control configuration information and TPC information (S615).

At this time, the transmit power for specific power control domains among the multiple power control domains may be determined based on common TPC information (e.g., the above-described shared TPC). The transmit power for at least one power control domain except for the specific power control domains may be determined based on the TPC information (e.g., the above-described individual TPC or separated TPC) independently configured for each power control domain.

In this case, the specific power control domains may be selected based on the position (e.g., physical position) on the resource region of the uplink resource for each power control domain among the multiple power control domains. For example, where the respective uplink resources (i.e., the uplink resources individually used in the specific control domains) for the specific power control domains may be identical to each other or are positioned adjacent to each other, common TPC information may apply. Here, the uplink resource may correspond to at least one of the resource block, bandwidth part, or carrier.

Further, the multiple power control domains may include a first power control domain for uplink transmission that is based on uplink grant (e.g., the above-described grant-based transmission scheme) and a second power control domain for uplink transmission that is not based on uplink grant (e.g., the above-described grant-free transmission scheme). At this time, the TPC information for the second power control domain may be transmitted in combination with the HARQ-ACK feedback that the base station transmits.

Further, the time of reception of the TPC information may be set to differ per power control domain. At this time, the power control configuration information may include information indicating the time of reception of TPC information for each of the multiple power control domains.

Overview of Devices to Which Present Disclosure is Applicable

FIG. 7 illustrates a block diagram of a wireless communication device to which methods proposed in this specification may be applied.

Referring to FIG. 7, a wireless communication system includes a base station 710 and multiple UEs 720 positioned within an area of the base station 710.

The BS 710 includes a processor 711, a memory 712, and a radio frequency (RF) unit 713. The processor 711 implements a function, a process, and/or a method which are proposed in FIGS. 1 to 6 above. Layers of a radio interface protocol may be implemented by the processor 711. The memory 712 is connected with the processor 711 to store various pieces of information for driving the processor 711. The RF unit 713 is connected with the processor 711 to transmit and/or receive a radio signal.

The UE 720 includes a processor 721, a memory 722, and an RF unit 723.

The processor 721 implements a function, a process, and/or a method which are proposed in FIGS. 1 to 6 above. Layers of a radio interface protocol may be implemented by the processor 721. The memory 722 is connected with the processor 721 to store various pieces of information for driving the processor 721. The RF unit 723 is connected with the processor 721 to transmit and/or receive a radio signal.

The memories 712 and 722 may be positioned inside or outside the processors 711 and 721 and connected with the processors 711 and 721 by various well-known means.

As an example, in a wireless communication system supporting a low latency service, the UE may include a radio frequency (RF) unit for transmitting and receiving a radio signal and a processor functionally connected with the RF unit in order to transmit and receive downlink (DL) data.

Further, the base station 710 and/or the UE 720 may have a single antenna or multiple antennas.

FIG. 8 is a block diagram of a communication device according to an embodiment of the disclosure.

Particularly, FIG. 8 is a diagram illustrating a UE shown in FIG. 7 in more detail.

Referring to FIG. 8, the UE includes a processor (or digital signal processor (DSP)) 810, an RF module (or RF unit) 835, a power management module 805, an antenna 840, a battery 855, a display 815, a keypad 820, a memory 830, a subscriber identification module (SIM) card 825 (optional), a speaker 845 and a microphone 850. The UE may include a single antenna or multiple antennas.

The processor 810 may be configured to implement the functions, procedures and/or methods proposed by the disclosure as described in FIGS. 1 to 6. Layers of a wireless interface protocol may be implemented by the processor 810.

The memory 830 is connected to the processor 810 and stores information related to operations of the processor 810. The memory 830 may be located inside or outside the processor and may be connected to the processors through various well-known means.

A user enters instructional information, such as a telephone number, for example, by pushing the buttons of a keypad 820 or by voice activation using the microphone 850. The processor receives and processes the instructional information to perform the appropriate function, such as to dial the telephone number. Operational data may be retrieved from the SIM card 825 or the memory 830 to perform the function. Furthermore, the processor may display the instructional and operational information on the display 815 for the user's reference and convenience.

The RF module 835 is connected to the processor and transmits and/or receives an RF signal. The processor forwards instructional information to the RF module, to initiate communication, for example, transmits radio signals comprising voice communication data. The RF module includes a receiver and a transmitter to receive and transmit radio signals. An antenna 840 facilitates the transmission and reception of radio signals. Upon receiving radio signals, the RF module may forward and convert the signals to baseband frequency for processing by the processor. The processed signals may be transformed into audible or readable information outputted via the speaker 845.

The aforementioned embodiments are achieved by a combination of structural elements and features of the disclosure in a predetermined manner. Each of the structural elements or features should be considered selectively unless specified separately. Each of the structural elements or features may be carried out without being combined with other structural elements or features. In addition, some structural elements and/or features may be combined with one another to constitute the embodiments of the disclosure. The order of operations described in the embodiments of the disclosure may be changed. Some structural elements or features of one embodiment may be included in another embodiment, or may be replaced with corresponding structural elements or features of another embodiment. Moreover, it is apparent that some claims referring to specific claims may be combined with another claims referring to the other claims other than the specific claims to constitute the embodiment or add new claims by means of amendment after the application is filed.

The embodiments of the disclosure may be achieved by various means, for example, hardware, firmware, software, or a combination thereof. In a hardware configuration, the methods according to the embodiments of the disclosure may be achieved by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, etc.

In a firmware or software configuration, the embodiments of the disclosure may be implemented in the form of a module, a procedure, a function, etc. Software code may be stored in the memory and executed by the processor. The memory may be located at the interior or exterior of the processor and may transmit data to and receive data from the processor via various known means.

It will be apparent to those skilled in the art that various modifications and variations can be made in the disclosure without departing from the spirit or scope of the disclosures. Thus, it is intended that the disclosure covers the modifications and variations of this disclosure provided they come within the scope of the appended claims and their equivalents.

Industrial Availability

Although the scheme of controlling transmit power in the wireless communication system according to the disclosure has been described in connection with examples in which it applies to 5G systems (new RAT systems), the scheme is also applicable to other various wireless communication systems.

The invention claimed is:

1. A method of transmitting an uplink channel in a wireless communication system, the method performed by a user equipment (UE), the method comprising:
   receiving, from a base station, downlink control information (DCI) including first transmission power control (TPC) information and second TPC information for the uplink channel; and
   transmitting, to the base station, the uplink channel using transmission power determined based on the DCI,
   wherein, based on the uplink channel being repeatedly transmitted, the transmission power for a first repetition of the uplink channel is determined based on the first TPC information and the transmission power for a second repetition of the uplink channel is determined based on the second TPC information, and
   wherein the first TPC information and the second TPC information are respectively associated with the first repetition and the second repetition in a predetermined order.

2. The method of claim 1, wherein a first uplink resource of the first repetition and a second uplink resource of the second repetition are identical to each other or are located differently from each other.

3. The method of claim 2, wherein each of the first uplink resource and the second uplink resource comprises at least one of a resource block, a bandwidth part, or a carrier.

4. The method of claim 1, wherein a first power control parameter of the uplink channel is determined based on the first TPC information and a second power control parameter of the uplink channel is determined based on the second TPC information, and
   wherein the transmission power for a first repetition of the uplink channel is determined based on the first power control parameter and the transmission power for a second repetition of the uplink channel is determined based on the second first power control parameter.

5. A UE of transmitting an uplink channel in a wireless communication system, the UE comprising:
   at least one transceiver for transmitting and receiving a radio signal; and
   at least one processor for controlling the at least one transceiver,
   wherein the at least one processor is configured to:
   receive, from a base station, downlink control information (DCI) including first transmission power control (TPC) information and second TPC information for the uplink channel; and
   transmit the uplink channel using transmission power determined based on the DCI,
   wherein, based on the uplink channel being repeatedly transmitted, the transmission power for a first repetition of the uplink channel is determined based on the first TPC information and the transmission power for a second repetition of the uplink channel is determined based on the second TPC information, and
   wherein the first TPC information and the second TPC information are respectively associated with the first repetition and the second repetition in a predetermined order.

6. The UE of claim 5, wherein the first uplink resource of the first repetition and the second uplink resource of the second repetition are located differently from each other.

7. The UE of claim 6, wherein each of the first uplink resource and the second uplink resource comprises at least one of a resource block, a bandwidth part, or a carrier.

8. The UE of claim 5, wherein a first power control parameter of the uplink channel is determined based on the first TPC information and a second power control parameter of the uplink channel is determined based on the second TPC information, and
   wherein the transmission power for a first repetition of the uplink channel is determined based on the first power control parameter and the transmission power for a second repetition of the uplink channel is determined based on the second first power control parameter.

9. A method of receiving an uplink channel in a wireless communication system, the method performed by a based station, the method comprising:
   transmitting, to a user equipment (UE), downlink control information (DCI) including first transmission power control (TPC) information and second TPC information for the uplink channel; and receiving, from the UE, the uplink channel based on the DCI, wherein, based on the uplink channel being repeatedly transmitted, the transmission power for a first repetition of the uplink channel is determined based on the first TPC information and the transmission power for a second repetition of the uplink channel is determined based on the second TPC information, and wherein the first TPC information and the second TPC information are respectively associated with the first repetition and the second repetition in a predetermined order.

10. The method of claim 9, wherein a first power control parameter of the uplink channel is determined based on the first TPC information and a second power control parameter of the uplink channel is determined based on the second TPC information, and wherein the transmission power for a first repetition of the uplink channel is determined based on the first power control parameter and the transmission power for a second repetition of the uplink channel is determined based on the second first power control parameter.

* * * * *